No. 766,845. PATENTED AUG. 9, 1904.
D. T. SHARPLES.
PROCESS OF MILKING.
APPLICATION FILED JUNE 20, 1902.
NO MODEL.
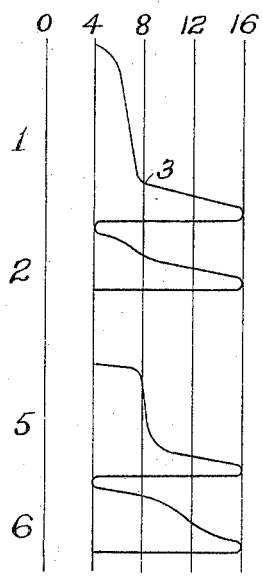
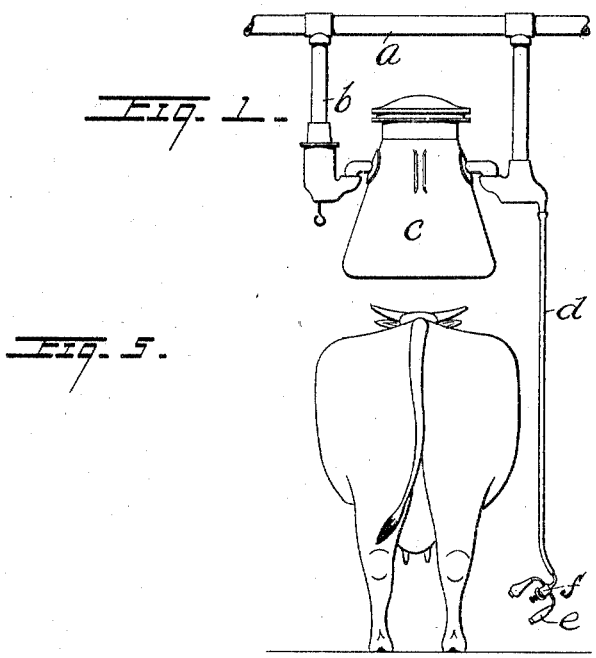
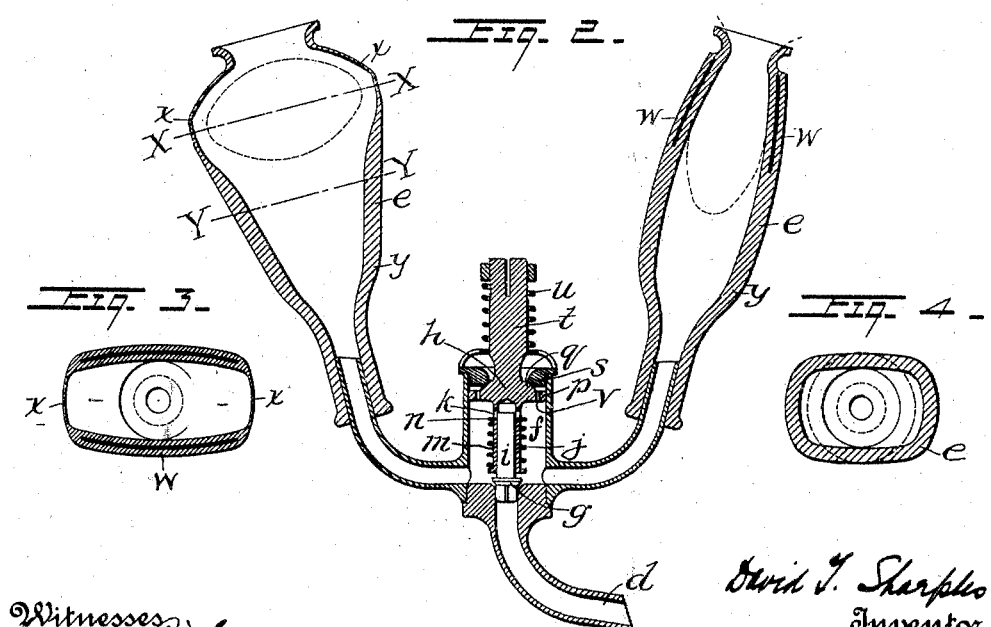

No. 766,845. Patented August 9, 1904.

UNITED STATES PATENT OFFICE.

DAVID TOWNSEND SHARPLES, OF WESTCHESTER, PENNSYLVANIA.

PROCESS OF MILKING.

SPECIFICATION forming part of Letters Patent No. 766,845, dated August 9, 1904.

Application filed June 20, 1902. Serial No. 112,430. (No model.)

*To all whom it may concern:*

Be it known that I, DAVID TOWNSEND SHARPLES, a citizen of the United States, residing at Westchester, county of Chester, State of Pennsylvania, have invented certain new and useful Improvements in Processes of Milking, of which the following is a specification.

My invention relates to automatic milking, and has for its object certain improvements in the process whereby the action upon the cow is automatically regulated in accordance with the varying condition and will or whim of the cow, thereby providing what I term a "sympathetic" action.

The invention is fully described in connection with the accompanying drawings, illustrating a mechanism adapted to carry the same into effect and which is made the subject of a separate application.

The present invention is specifically pointed out in the claims.

Figure 1 shows the general arrangement of a pneumatic milking system adapted to carry out my improved process. Fig. 2 shows the teat-cup mechanism thereof in sectional elevation. Figs. 3 and 4 are cross-sectional views of the particular form of teat-cup shown, taken, respectively, on the lines $x$ $x$ and $y$ $y$ of Fig. 2. Fig. 5 indicates diagrammatically the differing milking actions resulting automatically under different conditions.

I will fully describe my improved process in connection with a description of the apparatus shown, referring first to Fig. 1, in which $a$ represents a portion of a main line of air-pipe arranged in connection with a pump or reservoir for maintaining therein an approximately uniform vacuum, and $b$ one of the valved branch pipes therefrom arranged in connection with the upper portion of a milk pail or receptacle $c$, which latter is also in connection with a milk-pipe $d$, having terminal teat-cup connections for the cow or cows to be milked thereby. These features are commonly employed in milking apparatus to provide for applying suction to the cow's teats, and pneumatic means have heretofore been provided to produce pulsations of the teat-cups for the purpose of discharging the milk from the teats by alternately increasing and reducing the degree of vacuum therein. While these pulsations materially assist in withdrawing the milk from the cow, it will be readily understood that in order to secure the best results they should not be produced arbitrarily at regular intervals and with a fixed intensity of action without regard to the condition and will of the cow, which largely affects the freedom of the milk flow, but that they should be automatically regulated as to frequency or character in sympathy therewith, so as to make the process not only more agreeable to the cow, but more rapid and economical. Some cows are "easy milkers," while others are "hard milkers," and the same cow at different milkings and at different stages of a given milking yields up her milk more or less readily. In a truly-automatic process, therefore, the pulsating action should be automatically varied in sympathy with these varying conditions of the cow, or, in other words, with the varying freedom of the milk flow from the cow. Such a process, and such only, fully meets the requirements, and my invention consists in effecting it. The mechanism required is simple, but will be described in detail as practically adapted to the purpose.

The teat-cups $e$ are all connected, as shown, to a common teat-cup chamber $f$, about which they are grouped, and this chamber is arranged in communication with the milk-tube $d$, by which the cups and pulsating mechanism are carried, and with the connected milk-receptacle and vacuum-pipes $b$ and $a$. The check-valve $g$, as shown, is provided to restrict the capacity of the milk-tube $d$, which also serves as a passage-way for the air exhausting from the teat-cups and chamber $f$ and to automatically shut off the latter when the maximum vacuum has been attained and the relief or air-inlet valve $h$, hereinafter referred to, is opened. This check-valve $g$ is formed, as shown, with a stem $i$, which is in telescopic engagement with the hollow stem $m$ of a relief-valve $f$, by which it is adapted to be moved, though capable of a limited independent movement controlled by a spring $j$. This spring is arranged to normally hold the check-valve $g$ in its nearest position to the valve $h$, but permits of a movement of the latter against the increasing tension of the spring within the limits of a slot $k$ in the hollow stem $m$, which guides projections $n$ on the inclosed stem $i$. The relief-valve $h$ comprises a piston portion $p$, which fits within the cylindrical chamber $f$, and a conical portion $q$, which seats in a corresponding opening in the head $s$ of the chamber-body, and it is provided with a projecting stem $t$, having an adjusting-nut at its upper end and an inclosing spring $u$, which is arranged to normally press the valve $h$ against its seat. An air inlet or inlets $v$ are provided through the piston $p$ to the chamber $f$. The operation of this pulsating mechanism is as follows: In the positions shown the relief-valve $h$ is closed and check-valve $g$ held only slightly open, the spring $j$ being compressed under the suction or pressure on said valve $g$, due to the difference in pressure between the teat-cup chamber $f$ and the remainder of the system. The vacuum in the system, operating through the open check-valve $g$, while tending to produce a corresponding vacuum in the teat-cup region (comprising the teat-cups and chamber $f$) produces a suction on it sufficient to cause the milk to flow and only increasing as greater compression of the teat is required to secure this result. If the cow allows the milk to flow easily, this increase of the vacuum in the teat-cup region will be correspondingly slow, the flow of milk being of such volume as to correspondingly shut off the flow of air, while, on the other hand, if the flow is not easy and more frequent compression of the teats is required the vacuum is more quickly increased in the teat-cup region to the point at which it is intended to relieve it, and thereby to reëxpand the teat-cups preparatory to renewing the milking action. In any case, when the vacuum in the teat-cups is sufficiently increased the tension of the spring $j$ overcomes the reduced suction on it and pushes it up into its raised position in the socketed relief-valve stem $m$, and whenever the maximum vacuum-point is reached in the chamber $f$ the atmospheric pressure on the exposed valve portion $q$ of the relief-valve $h$ overcomes the tension of spring $n$ and slightly opens it, admitting atmospheric air against the increased area of the piston portion $p$, and so pressing the latter downward, together with the check-valve $g$, until the latter is seated and communication with the vacuum system thus cut off. The effective air-pressure on the relief-valve $h$, however, is reduced as the air passes through the restricted opening or openings $v$ in the piston and reduces the vacuum beneath it until the tension of spring $n$ overcomes the said pressure and raises the whole relief-valve $h$ as far as it is permitted by the clearance in slot $k$ of the hollow stem, the spring $j$ being compressed by this movement, but the suction on check-valve $f$ preventing it from being immediately raised from its seat, as is necessary in order to permit the entire closing of the relief-valve $q$. The latter thus remains slightly open, still permitting air to enter the chamber $f$ until the vacuum in the latter is reduced to the minimum, when the spring $u$ overbalances the air-pressure on piston-valve $p$ and also the suction on the check-valve $g$ and slightly raises the latter in moving tightly to the seat $r$, thus bringing the parts again to the position indicated in the drawings in readiness for a repetition of the operation, as just described.

It will be seen that my invention provides for attaining radically new and important results in the art to which it relates. The teats are automatically manipulated in sympathy with the varying freedom of the milk flow instead of arbitrarily without regard to varying conditions. The frequency of the pulsations, as described, varies automatically in accord with the amount of action required to secure the withdrawal of the milk from the cow.

My improvement consists, further, in first partially compressing the upper or base portion of the teat, so as to reduce the cross-section at this point without cutting off communication with the udder and at the same time put some pressure upon the portion of the teat below this point, as indicated in the drawings, which pressure tends to assist in the withdrawing of the milk; second, in maintaining moderate suction on the teat without collapsing the same so long as the milk continues to flow freely; third, in further compressing the upper portion of the teat as the suction becomes less effective to shut off the supply of milk therein from the udder; fourth, in collapsing the body of the teat to forcibly discharge the milk therefrom, and, fifth, in quickly relieving the pressure on the teat, so as to permit the resupply of milk to the latter from the udder. By this improvement in the process the sympathetic action is maintained, the pulsations or alternate collapsing and release of the teats being effected at automatically-varied intervals in sympathy with the varying freedom of the milk flow; but in connection with this the teats are automatically manipulated at intervals in the natural manner to finally discharge the milk therefrom—namely, by cutting off the communication between the teat and the udder and then compressing the body of the teat progressively downward to expel the milk. This action may be effected by merely proportioning the surface area and rigidity of the walls of the teat-cup at different portions, so as to cause a sufficient uniform pressure upon the whole exterior surface of the cup to first collapse or flatten the mouth portion and thereafter the lower portion, as described. As shown in the drawings, the opposite stiffened portions $w$ of the walls below the mouth are widened, so as to provide a comparatively large pressure area, and are connected by yielding wall portions x, which readily collapse, while the walls of the lower portion y of the cup are relatively rigid. When thus properly proportioned, external pressure on the walls will collapse them, together with the inclosed teat, from the mouth downward, the extent of the collapse depending upon the amount of the pressure, which latter in turn increases more or less rapidly in proportion to the freedom of the milk flow.

The action may be explained more clearly in connection with the diagrams shown in Fig. 5, in which the parallel vertical lines represent various degrees of vacuum, while the difference in form and height of the diagrams 1 and 2 indicates roughly the difference in action resulting automatically under conditions of easy and hard milking, respectively. The minimum degree of vacuum, which serves to insure the holding of the cup mechanism to the teats is represented by the vertical line 4. We will assume that the teat-cup is adapted to fully compress the base of the teat at a degree of vacuum represented by the line 8. In diagram 1 the cow is milking easily and the vacuum rises slowly, reaching the cut-off point 3 only after a considerable delivery of milk through a more or less extended period of time, (indicated by the height of the diagram above the point 3.) The portion of the diagram below point 3 indicates the running up of the vacuum to the maximum (during which the teat is fully compressed) and the quick release automatically to the minimum. In diagram 2 the milk is not yielded up readily and the vacuum increases quickly to the cut-off point 3, the reduced height of the diagram indicating the reduction of time between pulsations as compared with the freer action indicated in diagram 1. The amount of pressure required to fully compress the teat will vary in different cases; but in any event it is finally run up to the maximum before the release to minimum automatically takes place.

The manipulation of the teats automatically in sympathy with the freedom of the milk flow is the essential feature of my invention, and it is immaterial, so far as the broad process is concerned, how the manipulation is varied so long as it is automatically effected by and in harmony with the varying freedom of the milk flow. In the ordinary process of hand-milking the operator commonly compresses the base portion of the teat, so as to cut off communication with the udder, and thereafter collapses the body of the teat progressively downward to expel the charge of milk contained therein, and it is evident not only that the time required to fully collapse the teat varies somewhat with the size of the teat and the amount of milk stored in it, but also that the amount of pressure required to so collapse the body of the teat to expel the milk varies considerably in different cases, owing to the more or less constricted teat-opening or other varying conditions. Thus in one case it may be necessary to exert a given maximum pressure upon the teat during the collapsing movement, whereas in another the teat may be entirely collapsed by existing a much less pressure. My improved process contemplates automatically varying the degree of pressure exerted upon the teat during the collapsing movement in accordance with the requirements of each particular case, as well as automatically varying the length of time consumed in each compression or pulsation in accordance with the varying quantity of milk delivered during such pulsation. In the lower diagrams shown in Fig. 5 the character of the pulsations by my improved process under the conditions of easy and hard milking now being considered are indicated at 5 and 6, respectively. In diagram 5 it is assumed that the top of the teat is first closed by a degree of pressure represented by the line 8, that further compression to expel the stored milk from the teat goes on with little or no increase of pressure during a period of time which is shorter than the period of time under the conditions previously considered (diagram 1) where communication with the udder remains open, but which, nevertheless, may vary considerably because of the difference in quantity of milk stored in different cases, as well as the different-sized streams in which it is practicable to discharge it. Thus in diagram 5 the pressure remains substantially at the eight-degree line during a period of time represented by the height thereof, after which the pressure runs up quickly to the maximum for a repetition. In diagram 6 the base of the teat is represented as being closed by a pressure somewhat above the eight-degree line and the further compression to expel the stored milk in the teat as requiring an increased pressure during a period of time which, notwithstanding the comparative difficulty with which the milk discharges, may be shorter, as indicated, than in the case of the easier-milking conditions of diagram 5, owing, perhaps, to comparative smallness of the teat. Thus both the time required for a pulsation and the pressure required to effect it are variable because of varying conditions, even when the action is to first entirely cut off the communication between the teat and the udder, and the importance in all cases of automatically varying the manipulation of the teats in accordance or sympathy with such varying conditions is apparent.

What I claim is—

1. The improvement in the art of milking which consists in subjecting the teats to pneumatic milking action varying inversely with the varying volume of the milk flow.

2. The improvement in the art of milking which consists in applying suction to the teats and varying the same inversely with the varying volume of the milk flow.

3. The improvement in the art of milking, which consists in subjecting the teats to a pneumatic pulsating action varying inversely with the varying volume of the milk flow.

4. The improvement in the art of milking, which consists in applying suction to the teats and subjecting the same to a pneumatic pulsating action varying inversely with the varying volume of the milk flow.

5. The improvement in the art of milking, which consists in applying suction to the teats varying in degree, inversely with the varying volume of the milk flow and in simultaneously subjecting the teats to a pneumatic pulsating action.

6. The improvement in the art of milking, which consists in simultaneously applying suction to the teats and subjecting the same to pneumatic pulsating action, said suction and pulsating action being varied inversely with the varying volume of the milk flow.

7. The improvement in the art of milking, which consists in applying suction to the teats and varying the same between a fixed maximum and a fixed minimum, inversely with the varying volume of the milk flow.

8. The improvement in the art of milking, which consists in subjecting the teats to a pneumatic pulsating action varying inversely with the varying volume of the milk flow between a fixed maximum and a fixed minimum of intensity.

In testimony whereof I affix my signature in the presence of two witnesses.

DAVID TOWNSEND SHARPLES.

Witnesses:
   H. C. MEREDITH,
   I. ROBERTS COMFORT.